P. KRAUS.
Grinding Mill.
No. 103,626. Patented May 31, 1870.
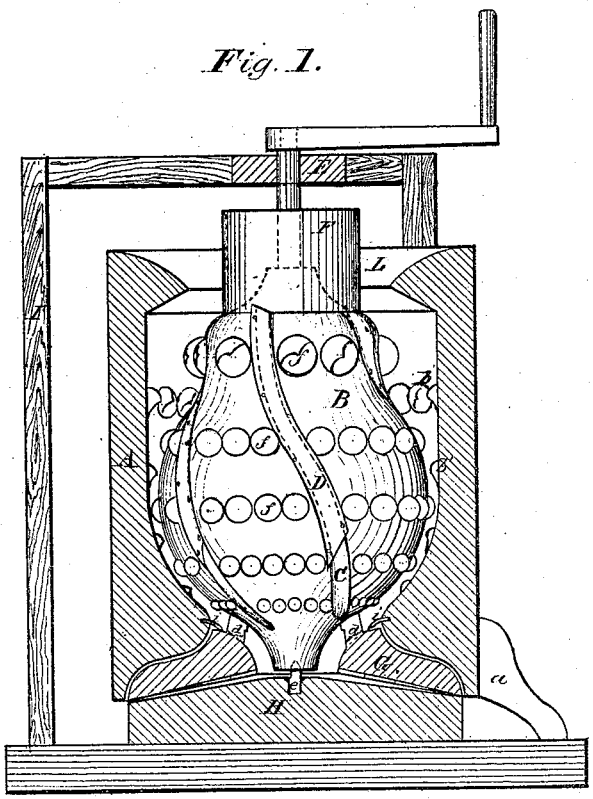
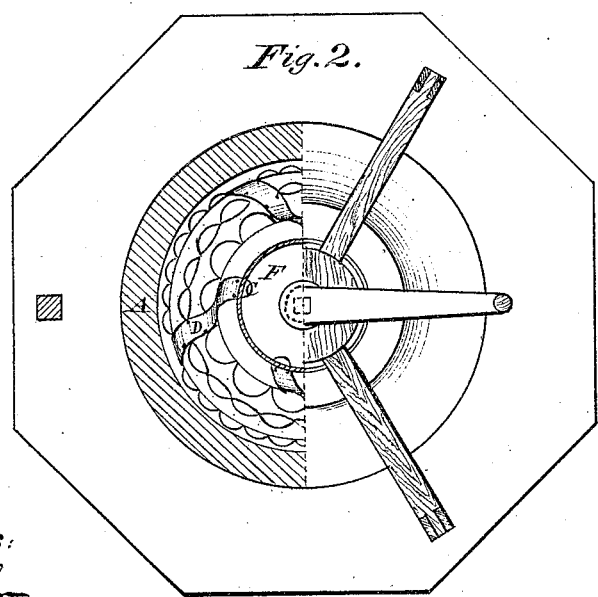
Witnesses:
Geo. F. Schäfer
H. H. Boyer
Inventor
Philip Kraus

United States Patent Office.

PHILIP KRAUS, OF AUGUSTA, GEORGIA.

Letters Patent No. 103,626, dated May 31, 1870.

IMPROVEMENT IN GRINDING-MILLS.

The Schedule referred to in these Letters Patent and making part of the same.

I, PHILIP KRAUS, of Augusta, county of Richmond, State of Georgia, have invented an Improvement in Grinding-Mills, of which the following is a full, clear, and exact description, reference being had to the accompanying drawing forming a part of this specification.

This invention relates to improvement in grinding-mills especially adapted for grinding paint, but may be also used for grinding bones, ores, &c., from their crude or original state, and consists in the peculiar arrangement and construction of the various parts more fully herein set forth and described.

In the accompanying drawing—

Figure 1 represents a vertical section.

Figure 2 represents a half plan view and half horizontal section.

Figures 3 and 4 show the shape of the peculiar cutting-teeth.

In the drawing—

A is the outer casing, supported on proper legs $a$, and having cutting-teeth of a peculiar construction on its inner side, shown at $b\ b'$.

The upper part is beveled to answer for a hopper, L, into which the raw material to be ground is fed. In this case I place the revolving muller or grinder B, also provided with the peculiarly-shaped teeth $f$.

In it I cut spiral semicircular grooves C, covered about two-thirds of their length, as shown at D.

This grinder is centered in a suitable step, shown at $e$, and proper journal, supported by a frame, I, and cross-pieces E, and is revolved by any suitable motive power, a crank being shown in the drawing.

Attached to the top of grinder B is arranged a suitable hopper, F, for the admission of water into it, used for the purpose of assisting in the grinding operation of the finer material.

The water from this hopper passes through the spiral grooves C to the lower part, and is there mixed with the already considerably reduced material.

The object of covering these grooves partly is to prevent the water from at first mixing with the coarse material, as thereby it becomes clammy and muddy, and is harder to break than when dry.

The partly-ground material then passes between the lower grinding-disks G and H, wherein it is properly ground to any desired fineness.

The upper one, G, of these is attached or connected to the grinder B by four arms, $d$, fig. 1, and revolves with it, thereby becoming the runner.

The lower one H is permanently fixed to a suitable bed-plate K, being the stationary bur.

In the lower part of the casing A is also arranged a guide-plate, $i$, to prevent the material from passing out between the casing and runner G.

The teeth $b$ and $f$, figs. 3 and 4, are of a peculiar shape, having a part concave and part convex face, as shown at $h$ and $i$, thereby receiving a sharp spiral cutting-edge, $g$, and being of great strength at their base, preventing them from being easily broken off.

The operation is as follows:

Proper power having been connected, the crude material is fed into the hopper. The larger pieces are broken by the teeth arranged in the upper part of the mill, and, as they pass the covered part of grooves C, mix with the water admitted into the hopper F, passing thence to the runners G and H, where the material is very finely ground, and from there into any suitable receptacle on their outer periphery.

Having thus fully described my invention,

What I claim and desire to secure by Letters Patent, is—

1. The muller or grinder B, provided with teeth $f$, spiral semicircular grooves C, partly covered, and hopper F, substantially as herein described.

2. The combination of the grinder B, teeth $f$, grooves C, and hopper F, with the runners G and H.

3. The peculiarly-shaped teeth $b$ and $f$, having a cutting-edge $g$, and concave and convex faces $h$ and $i$, as and for the purpose set forth.

4. The spiral semicircular partly-covered grooves C in the muller B, substantially as and for the purpose set forth.

5. The combination and arrangement of the casing A, having teeth $b\ b'$ on its inner side, with the grinder B provided with teeth $ff$, grooves C, hopper F, runners G and H, all constructed substantially as herein described and for the purpose set forth.

PHILIP KRAUS.

Witnesses:
GEO. P. SCHAFER,
H. H. BOYER.